United States Patent
Kurath et al.

[15] 3,697,547
[45] Oct. 10, 1972

[54] ERYTHRONOLIDE B DERIVATIVES

[72] Inventors: Paul Kurath, Waukegan; Richard Stephan Egan, Mundelein, both of Ill.

[73] Assignee: Abbott Laboratories, North Chicago, Ill.

[22] Filed: Dec. 18, 1970

[21] Appl. No.: 99,641

[52] U.S. Cl....................................260/343, 260/999
[51] Int. Cl. ...............................................C07d 9/00
[58] Field of Search.......................................260/343

[56] References Cited

UNITED STATES PATENTS 3,366,647  1/1968  Perun..........................260/343
3,415,848  12/1968  Perun..........................260/343

*Primary Examiner*—John M. Ford
*Attorney*—Robert L. Niblack

[57] ABSTRACT 8,9-Anhydroerythronolide B 6,9-hemiketal and 8-hydroxyerythronolide B are respectively successive intermediates for the preparation of 3-mycarosyl-8-hydroxyerythronolide B which is useful as an antipyretic.

3 Claims, No Drawings

ERYTHRONOLIDE B DERIVATIVES

DISCLOSURE OF THE INVENTION

This invention relates to derivatives of erythronolide B which are useful as successive intermediates for producing 3-mycarosyl-8-hydroxyerythronolide B. This latter compound is useful as an antipyretic as demonstrated in standard animal pharmacological procedures, and is fully described in the U.S. Pat. application entitled Antipyretic Agent, filed herewith on behalf of Jerry Martin, Ser. No. 99,705, filed Dec. 18, 1970.

Erythronolide B is described in U.S. Pat. No. 3,127,315, P.L. Tardrew et al. The compounds of this invention are derived from erythronolide B and have the structural formula:

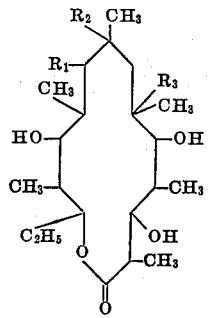

when $R_2$ and $R_3$ are hydroxy and $R_1$ is oxo (i.e., O=); and when $R_1$ and $R_2$ are joined together forming a double bond between the 8,9-positions, and $R_3$ forms an oxygen bridge between the 6,9-positions.

The reaction scheme for preparing the 3-mycarosyl-8-hydroxy erythronolide is set forth below.

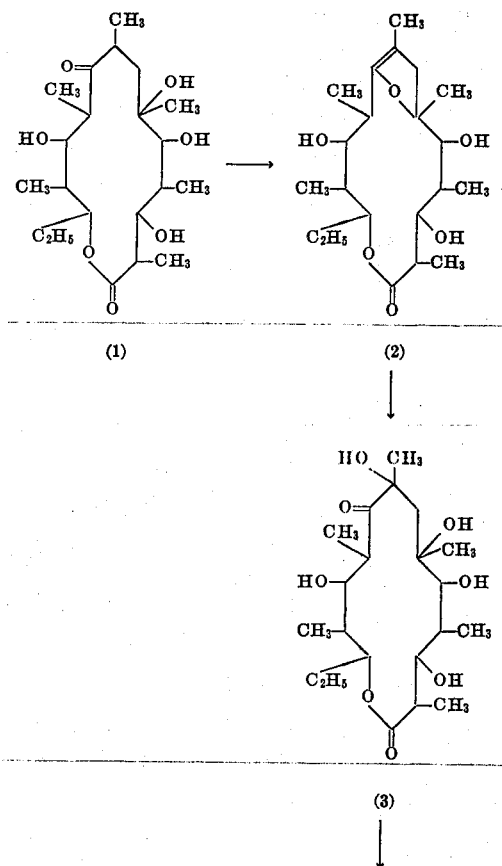

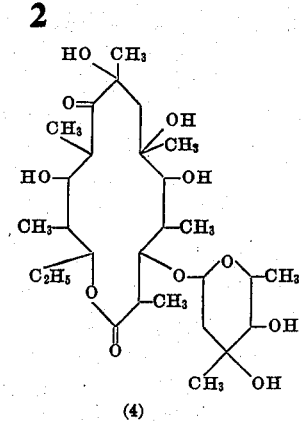

(4)

In this reaction scheme, erythronolide B (1) is treated with an anhydrous acid such as a methanolic solution of hydroxylamine hydrochloride or glacial acetic acid to form the 6,9-oxygen bridged compound, 8,9-anhydroerythronolide B 6,9-hemiketal (2). This compound, (2), is then subjected to oxidation such as for example in an osmium tetroxide-hydrogen peroxide mixture. This removes the 8,9-double bond thereby introducing hydroxyl into the 8-position and replacing the 6,9-oxygen bridge with oxo at the 9-position and hydroxy at the 6-position resulting in the product 8-hydroxy erythronolide B (3).

To this latter compound, (3), mycarose is added by biological reaction at the 3-position to form 3-mycarosyl-8-hydroxyerthronolide B.

The specific examples, hereinafter set forth, will illustrate the best mode of carrying out this invention.

EXAMPLE 1

8,9-Anhydroerythronolide B 6,9-Hemiketal

A mixture of 6.60 g. of erythronolide B, 6.00 g. of hydroxylamine hydrochloride, and 8.53 g. of barium carbonate in 70 ml. of methanol was warmed with stirring to a gentle reflux for 24 hours. The suspension was filtered through a short column of silica gel, the residue was washed with several small portions of hot methanol, the methanolic washes were combined with the original filtrate and evaporated to dryness. The residue was then purified by chromatography on 600 g. of silica gel. Evaporation of the early ethyl acetate eluates gave a residue of 2.10 g. of a colorless oil which was recrystallized from benzene to yield 1.12 g. of product, mp. 98°–102°. A portion of this sample was recrystallized form benzene for analysis: mp. 100°–102°; $[\alpha]_D^{26} +38°$ ($c=0.976$); $\tilde{V}_{max}$ 3612, 3490, 1710 cm$^{-1}$; $\lambda_{max}$ 209 nm ($\epsilon$ 6,920).

$C_{21}H_{36}O_6$ (384.50) Calcd: C, 65.59; H, 9.44; O, 24.97 percent

Found: C, 65.59; H, 9.35; O, 25.01 percent

EXAMPLE 2

8,9-Anhydroerythronolide B 6,9-Hemiketal

A solution of 6.60 g. of erythronolide B and 0.60 g. of hydroxylamine hydrochloride in 70 ml. of methanol was warmed and stirred to a gentle reflux for 1½ hours. The reaction mixture was evaporated to dryness under reduced pressure to leave a residue of 7.29 g. After chromatographic purification on silica gel and recrystallization from benzene 4.95 g. (78 percent yield) of the enol ether product, mp. 99°–103°, was isolated. An analytical sample had mp. 100°–103°; $[\alpha]_D^{26}$ +35° (c=1.086); $\tilde{V}_{max}$ 3612, 3490, 1710 cm$^{-1}$. A mixture melting point determination with the above sample showed no melting point depression. $C_{21}H_{36}O_6$ (384.50) Calcd: C, 65.59; H, 9.44 percent Found: C, 65.69; H, 9.71 percent

EXAMPLE 3

8,9-Anhydroerythronolide B 6,9-Hemiketal

A suspension of 2.74 g. of erythronolide in 20 ml. of glacial acetic acid was warmed gently on the steam bath to obtain a clear solution which was allowed to stand at room temperature for 2 hours. The solvent was evaporated on the steam bath under reduced pressure, the residue dissolved in 100 ml. of chloroform, and poured into 60 ml. of aqueous saturated sodium bicarbonate solution. The layers were separated and the aqueous phase was extracted once more with 100 ml. of chloroform. The chloroform solutions were washed with saturated sodium bicarbonate solution, dried over anhydrous magnesium sulfate, filtered, combined, and evaporated to leave a residue of 2.58 g. of solid. After chromatographic purification and recrystallization from benzene, 1.70 g. (62 percent yield) of the product, 8,9-anhydroerythronolide B 6,9-hemiketal, mp., 98°–104°, was obtained. The identity of this material with the above samples of (2) was confirmed by IR, and thin layer chromatography.

EXAMPLE 4

Hydrogen Peroxide - Osmium Tetroxide Oxidation of 8,9-Anhydroerythronolide B 6,9-Hemiketal A solution of 8.46 g. of the enol ether (2) in 45 ml. of t-bytyl alcohol, 27 ml. of hydrogen peroxide-t-butyl alcohol reagent, R.C. Hockett et al., *Journal American Chemical Society* 63, 2051 (1941), and 3 ml. of an 0.5 percent osmium tetroxide solution in t-butyl alcohol was allowed to stand at room temperature for 10 days. The yellow solution had turned colorless. The solvent was evaporated under high vacuum at room temperature; twice small amounts of t-butyl alcohol were added and likewise evaporated. After careful drying under high vacuum a residue of 9.74 g. was obtained which was chromatographed in two portions of 4.85 g. and 4.89 g., respectively, on two columns of 450 g. of silica gel. The early fractions of both chromatograms [benzene-ethyl acetate (1:1) and ethyl acetate eluates] contained substances which could not be obtained crystalline. Further elution of the columns with ethyl acetate led to the isolation of 3.12 g. of a substance which formed gels upon attempted crystallization. from acetone H-heptane. A part of this gelatinous material, 2.32 g., was rechromatographed on 230 g. of silica gel. The residues from the ethyl acetate eluates, 2.18 g., appeared to be pure in several thin layer chromatographic systems. A part of this compound, 1.19 g. was recrystallized twice from benzene to yield 0.90 g. of 8,9-anhydro-8,9-epoxyerythronolide B 6,9-hemiketal. The substance was further recrystallized from benzene to a constant mp. 184°–186° (capillary, after drying at 144° under high vacuum for several days to remove the benzene of crystallization); $[\alpha]_D^{26}$+45° (c=0.567); $\tilde{V}_{max}$ 3600, 3550, 3500-3300, 1720 cm$^{-1}$. $C_{21}H_{36}O_7$ (400.50) Calcd: C, 62.98; H, 9.06; O, 27.96 percent Found: C, 63.29; H, 9.11; O, 28.03 percent.

The residues from the latter fractions eluted with ethyl acetate of the original columns contained 3.21 g. of a crystalline substance which could be recrystallized from acetone-n-heptane to yield 1.53 g. of 8-hydroxyerythronolide B,mp. 227°–228°. A sample of this material was recrystallized to a constant mp. 228°–230°; $[\alpha]_D^{26}$ –24° (c=1.072); $\tilde{V}_{max}$ 3600, 3470, 1718, 1962 (shoulder) cm$^{-1}$; $\lambda_{max}$ 278 nm ($\epsilon$42). $C_{21}H_{38}O_8$ (418.51) Calcd: C, 60.26; H, 9.16; O, 30.58 percent
   Found: C, 60.47; H, 9.00; O, 30.37 percent The 8-hydroxyerythronolide is then utilized in the preparation of 3-mycarosyl-8-hydroxyerythronolide B as set forth in Example 5.

EXAMPLE 5

Fermentation Procedure:

Seed cultures of variant NRRL 3887 were prepared in a medium consisting of (in grams per liter) glucose monohydrate (Cerelose), 15.0; soy bean meal 15.0; and CaCO$_3$, 1.0. The cultures were incubated at 32° for 72 hours on a rotary shaker. The seed was added at a level of 3–5 percent (v/v) into 500 ml. Erlenmyer flasks containing 50 ml. or a fermentation medium consisting of the following components (in grams per liter): corn starch, 15.0; soya fluff flour, 20.0; corn steep, 5.0; CaCO$_3$, 1.0; and soy bean oil (Edsoy), 50.0. The fermentation flasks were incubated at 32° on a rotary shaker (260 rpm) for 48 hours. One gram of finely divided 8-hydroxyerythronolide B was equally distributed among 40 fermentation flasks and incubation with shaking was continued for 120 hours.

Recovery from Fermentation Beer

The fermentation beer was clarified by the addition with stirring of an equal volume of an aqueous solution of 10 percent zinc sulfate followed by an equal volume of 0.5N sodium hydroxide. A filer aid, Dicalite, was added and the mixture was stirred for 5 minutes. The mixture was filtered and the clear filtrate of pH 6.6 was collected. The filtrate was extracted twice with equal volumes of ethyl acetate. The combined ethyl acetate extract was washed twice with water and dried over anhydrous sodium sulfate. Concentration in vacuo gave 1.23 g. of viscous yellow-brown oil which solidified on standing. The solid material was dissolved in a small amount of chloroform and added to the top of a column (3.0 × 35 cm) of silica gel (Brinkman, 30–70 mesh) prepared in chloroform. Elution with increasing concentrations of methanol in chloroform gave fractions containing only a material with R$_f$ 0.29 by thin layer chromatography (Silica gel G, 95 percent) ethanolchloroform, 1:10 [v/v]). These fractions were collected and the solvent removed in vacuo to give 797 mg. of light yellow oil. The oil was dissolved in methanol and treated with an equal weight of charcoal (Darco G-60). Crystallization from methanol-water gave 327.5 mg. of 3-$\alpha$-L-mycarosyl-8-hydroxyerythronolide B as fine white needles, mp. 205°–208°.

What is claimed is:

1. A compound of the formula:

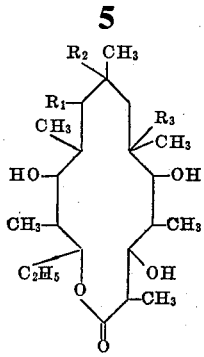

wherein when $R_2$ and $R_3$ are hydroxy, $R_1$ is oxo; and when $R_1$ and $R_2$ are joined together forming a double bond between the 8,9-positions, $R_3$ forms an oxygen bridge between the 6,9-positions.

2. The compound according to claim 1 in which $R_2$ and $R_3$ are hydroxy and $R_1$ is oxo, namely 8-hydroxyerythronolide B.

3. A compound according to claim 1 in which $R_1$ and $R_2$ form a double bond between the 8,9-position and $R_3$ forms an oxygen bridge between the 6,9-positions, namely, 8,9-anhydroerythronolide B 6,9-hemiketal.

* * * * *